No. 754,046. PATENTED MAR. 8, 1904.
W. B. BULMER.
TEA KETTLE.
APPLICATION FILED JULY 23, 1903.
NO MODEL.
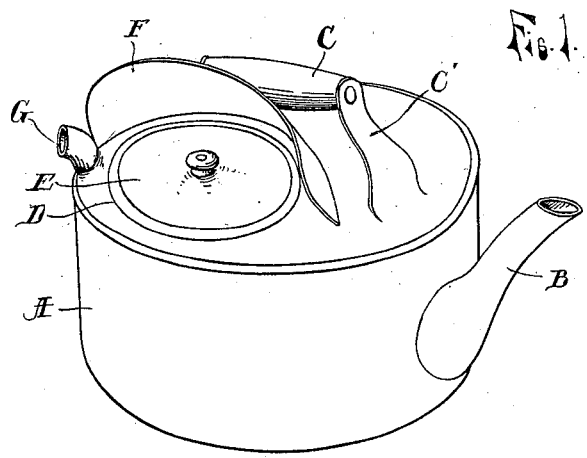
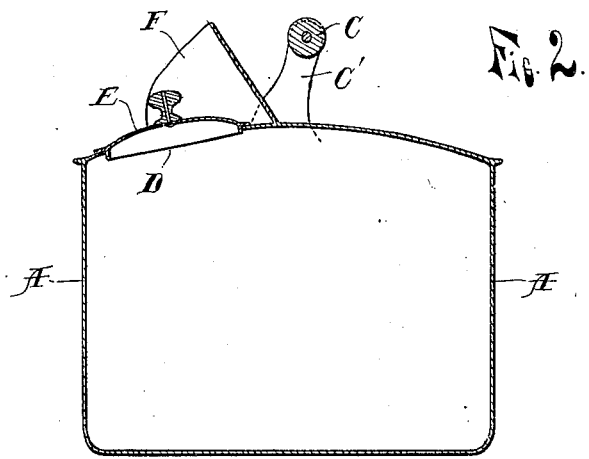
WITNESSES.
L. E. Flanders
Irene A. Flanders
INVENTOR.
William B. Bulmer
By Edmund J. Scully
Attorney No. 754,046. Patented March 8, 1904.

UNITED STATES PATENT OFFICE.

WILLIAM B. BULMER, OF WINDSOR, CANADA, ASSIGNOR OF ONE-FOURTH TO HARRY SLATER, OF WINDSOR, CANADA.

TEA-KETTLE.

SPECIFICATION forming part of Letters Patent No. 754,046, dated March 8, 1904.

Application filed July 23, 1903. Serial No. 166,659. (No model.)

*To all whom it may concern:*

Be it known that I, WILLIAM B. BULMER, a citizen of Canada, residing at Windsor, in the county of Essex and Province of Ontario, Canada, have invented certain new and useful Improvements in Tea-Kettles, of which the following is a specification.

This invention relates to improvements in tea-kettles; and its object is to provide the kettle with a rigid handle, so that it will be under better control and in providing means for protecting the hand of the user from the scalding steam.

It is also an object of the invention to provide certain other new and useful features and the particular arrangement of parts, all as hereinafter more fully described, and particularly pointed out in the claim, reference being had to the accompanying drawings, in which—

Figure 1 is a perspective view of a kettle embodying the invention, and Fig. 2 is a transverse vertical section of the same.

As shown in the drawings, A is the body of the kettle, which may be made in any desired size and shape; B, the spout, and C the handle, which is secured between the two ears C', connected to the kettle-top, so that the handle is rigidly attached to the kettle.

D is a fill-opening in the kettle-top, which opening is preferably oblong in shape and located at one side of the handle, so that the handle will not interfere with the ready removal of the cover E, which fits said opening, and the ears C' are preferably offset slightly toward the side of the kettle opposite that near which the opening is located, so that the kettle will balance in the hand of the user.

F is a shield connected to the kettle-top adjacent to the side of the fill-opening toward the handle and extending upward and outward a short distance over the opening to deflect any steam which may escape around the cover and protect the hand of the user. A short curved vent-pipe G is connected to the top at any convenient point to allow the steam to escape and direct it away from the handle and cover.

It is obvious that the kettle can be much more easily handled with a rigid handle than with one which is hinged to the kettle; but where the fill-opening is in the center of the top it is necessary to thus attach the handle in order that the cover may be removed. Where the opening is located at one side of the handle, the shield is necessary, for the edge of the cover comes directly beneath the handle, and the rising steam would come directly against the user's hand.

Having thus fully described my invention, what I claim is—

A kettle having a top provided with a fill-opening at one side of its center line, a cover to close said opening, a handle, ears on the top between which the handle is secured, said ears being offset to bring the handle to the side of the center line of the top opposite that at which the fill-opening is located, a vent-pipe extending through the top diametrically opposite the spout and a shield secured to the top between the opening and handle and extending outward and upward over said vent-pipe and the fill-opening.

In testimony whereof I have signed my name to this specification in presence of two witnesses.

WILLIAM B. BULMER.

Witnesses:
H. SLATER,
A. G. LEGGATT.